United States Patent [19]

Yang

[11] Patent Number: 4,689,508

[45] Date of Patent: Aug. 25, 1987

[54] SWITCHED SHADED-POLE TYPE INDUCTION MOTOR

[76] Inventor: Tai-Her Yang, 5-1 Taipin St., Si-Hu Town, Dzan-Hwa, Taiwan

[21] Appl. No.: 763,057

[22] Filed: Aug. 6, 1985

[51] Int. Cl.⁴ .......................... H02P 1/48; H02P 7/48
[52] U.S. Cl. .................... 310/68 E; 310/211; 310/225; 318/778; 318/791; 318/793
[58] Field of Search ............ 310/68 E, 182, 183, 310/197, 49 R, 125, 211, 212, 225, 172, 49; 318/774, 775, 778, 790, 783, 785, 787, 789, 793, 325; 361/29, 30, 31, 32, 33

[56] References Cited

U.S. PATENT DOCUMENTS 4,467,257 8/1984 Douthart et al. .................. 318/774
4,472,670 9/1984 Stanley ............................... 318/774

Primary Examiner—Patrick R. Salce
Assistant Examiner—D. L. Rebsch
Attorney, Agent, or Firm—Leonard Bloom

[57] ABSTRACT

A shaded pole induction motor includes a plurality of series-connected running windings and a plurality of series-connected shaded pole coils (windings). A normally closed, centrifugal-force-responsive switch is provided in series with the shaded pole coils to effect an interruption in current therethrough when the motor reaches a predetermined speed. As a replacement to the normally closed switch, a switch constituted by a relay winding and normally open relay contacts may be provided, the contacts being in series with the shaded pole coils, these normally open contacts being closed in response to high initial starting current in the running windings flowing through a relay winding and being opened again when the motor gets up to a predetermined speed; less current flows in the relay winding and in the running windings under this condition. A heat-responsive circuit breaker may be placed in series with the normally open contacts or centrifugal-force responsive switch.

12 Claims, 4 Drawing Figures

SWITCHED SHADED-POLE TYPE INDUCTION MOTOR

BACKGROUND OF THE INVENTION

This invention relates to an improved single phase induction motor provided with shaded poles. More particularly, the invention relates to such a motor having a centrifugal switch or a current-responsive switch for interrupting current in the shaded pole windings to avoid energy waste and local heating.

In conventional shaded-pole motors having either a copper ring, or coil short circuit, to obtain cross phase starting, both types have short circuit current passing during running. Such an arrangement is energy inefficient and may result in local high temperature, which may damage the motor.

SUMMARY OF THE INVENTION

In accordance with the present invention, a centrifugal switch or a current-responsive switch means is provided for cutting out current flow in the shaded pole windings after starting. An automatic heat-responsive circuit breaker may be provided to prevent overheating of the coil when the centrifugal switch is damaged.

DETAILED DESCRIPTION OF THE PREFERRED EMBODIMENTS

As is well known, the lowest cost and most popular single phase induction motors are of the shaded-pole starting type. Such motors are widely used in electric fans and sand wheels. However, this type motor has one common deficiency in operation after starting; there is a state of short circuit of the shaded pole coils, resulting in a waste of energy and causing local over-heating, which reduces the life of the motor and is troublesome. The present invention overcomes these shortcomings by providing that the shading coils be placed in series with a centrifugal switch or a running-current responsive switch, to improve the efficiency.

Figure 1:
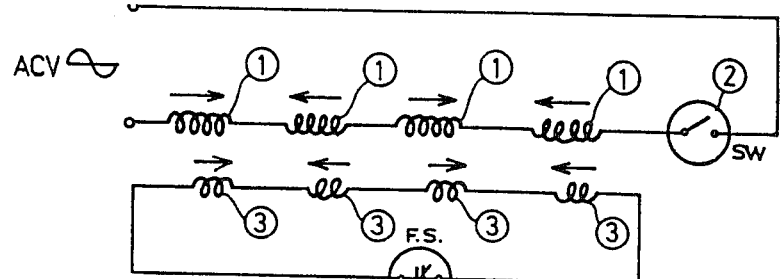
FIG. 1 is a simplified schematic diagram of a shaded pole induction motor, showing control of shading short circuit coils by a centrifugal switch, in accordance with the present invention.

The opening of the shading coil(s) short circuit may be effected by the centrifugal switch, or by the current-detecting switch. In FIG. 1, the illustrative first embodiment uses the centrifugal switch to control current in the shading coils.

As illustrated in FIG. 1, an alternating current induction motor running windings receive A.C. current via a switch 2. A plurality of shading coils 3 are connected in series to a normally closed centrifugal switch 4. When the A.C. source switch 2 is on, the running windings are charged and the shading coils 3 also have induced voltages therein, passing current through the centrifugal switch 4 to present a short circuit current to form a phase-displaced magnetic field similar to the rotating magnetic field of the running windings, thus making the squirrel cage rotor start and run. When the rotor reaches a predetermined speed, the centrifugal switch 4 opens and current through the shading coils 3 will be interrupted, avoiding energy waste and reducing the local overheating of the motor. The motor will continue to operate at better efficiency because of a better magnetic field when the shading coils are not functioning.

Figure 2:
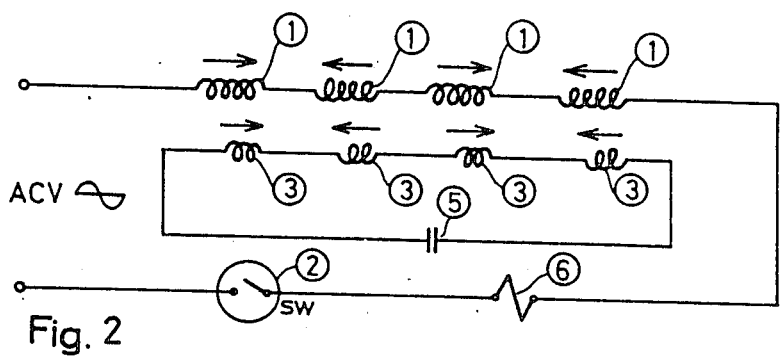
FIG. 2 is a simplified schematic diagram of a shaded pole induction motor, showing control of shading short coils by a control switch responsive to current in the running windings, in accordance with the present invention.

In FIG. 2, the illustrative second embodiment includes normally open relay contacts (switch) 5 which will interrupt current in the shading coils 3 when the motor reaches a predetermined speed. In FIG. 2 the current passes to the coils 3 through the relay contacts 5 so long as current to the running windings 1 passes through a relay coil 6, which is series connected between the control switch 2 and the running windings 1. In starting, high current flows through the running windings 1 and the relay coil 6, causing the relay contacts 5 to be made. As is well known, the curent in the running windings 1 will be smaller when the induction motor approaches running speed. Therefore, the magnetic force produced by the relay coil 6 will be smaller when the motor reaches a certain speed, allowing the contacts 5 to open, breaking the short circuit of the shading coils 3 to save energy and avoid the local overheating.

Figure 3:
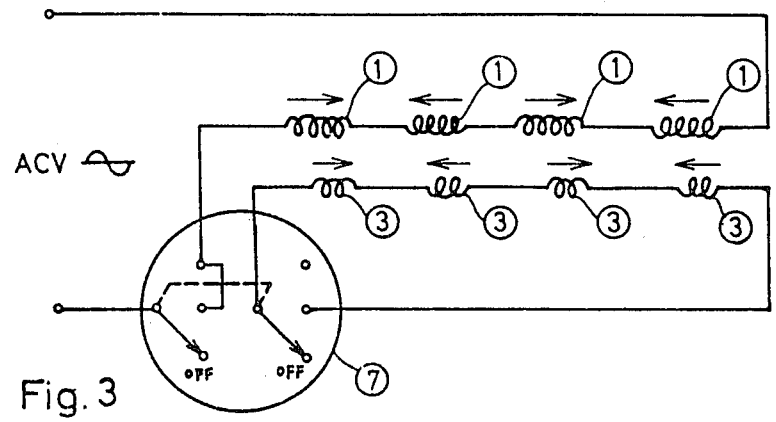
FIG. 3 is a simplified schematic diagram of a shaded pole induction motor, utilizing a manual switch for cutting off current in the shaded pole coils.

FIG. 3 is a demonstrative example of a manual switch for interrupting current in shaded pole windings. The switch 7 is a multiple position switch including first OFF position. The sand wheel machine or the like will not receive power in this position. When the manual switch 7 is moved to the second position, power is received by both the running coils 1 and the shaded pole windings 3, the switch 7 connecting the shading coils 3 in short circuit, and the sand wheel machine or the like starts. Then when the manual switch 7 is moved to the third position the running coils 1 continue to receive power continuously and the current to the shaded pole coils 3 is interrupted.

Figure 4:
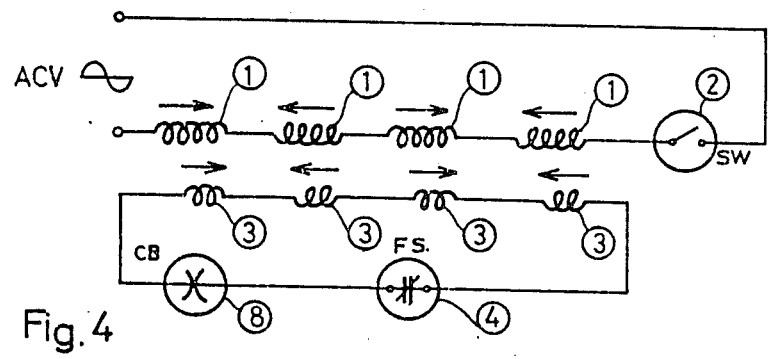
FIG. 4 is a simplified schematic diagram of a shaded pole induction motor as shown in FIG. 1, a heat-responsive circuit breaker being provided.

In FIG. 4, a third embodiment of the present invention, which is much like the first embodiment (FIG. 1), includes an arrangement for protecting the centrifugal switch 4 from damage by providing an automatic reciprocal heat-responsive circuit breaker 8. This unit is usually of the closed type and produces a relative heating when the current passing through the shading coils 3 passes through it. When the current has been too strong and the action has opened the circuit breaker 8, after heat is dissipated over a period of time, the breaker 8 returns automatically to a closed condition after cooling, and a cycling action results to protect the unit. Usually used for short circuits, the life of the breaker 8 will be about 20,000 cycles. The action cycle of the breaker 8 is 15 seconds, permitting a temporary short circuit to exist for about three days without damage to the motor. Therefore, this invention can be used for sand wheel machines, drilling machines, wood working machines and the like to protect the shaded pole coils 3 if the centrifugal switch 4 or an additional switch is damaged.

The above-noted centrifugal switch or additional current-responsive relay in accordance with the present invention assures that the shaded pole coils will be open-circuited properly after starting for preventing the multiple effect of overheating and energy waste. Further, the additional series automatic heat-responsive circuit breaker (FIG. 4) example will serve as an additional protection feature of the present invention. A comparison of the present invention to conventional induced cross motors phase and to shaded pole motors is set out below in tabular form in TABLE I.

TABLE I

| | Kinds | | |
|---|---|---|---|
| Quality | Shaded Pole Motor of Invention | Conventional Shaded Pole Motor | Conventional Induced Cross-Phase Motor |
| Starting power | Medium | Medium | Large |
| Temperature of starting coil | low temperature due to immediate cutting after start | local high temperature due to continuous short circuits | high temperature due to large power after start |
| High frequency starting | yes | yes | no (starting coil will be burnt) |
| Starting operating difficulty | easy | easy | not easy |
| Weight of starting coil required | less | less | doubled that of shaded pole |

The contacts of the centrifugal switch and current-responsive relay can be solid-state type units. Many alternative mechanical or solid-state type units could be used, but these, as in the illustrated embodiments, are aimed at the timely cutting off of current flow in the shading coils after starting of the shaded-pole induction motor.

What is claimed is:

1. A shaded pole induction motor comprising a plurality of running windings; a plurality of shaded pole coils, said shaded pole coils being connected in electrical series with each other; and a normally closed centrifugal force responsive switch means connected in series with all of said shaded pole coils and responsive to motor speed for interrupting current flow in all of the shaded pole coils whenever the motor reaches substantially a predetermined speed, whereby local overheating is reduced and energy waste is avoided.

2. The shaded pole induction motor according to claim 1, wherein the respective pluralities of running windings and shaded pole coils are equal.

3. The shaded pole induction motor according to claim 2, wherein each respective shaded pole coil is operatively coupled to a respective corresponding different one of the running windings.

4. A shaded pole induction motor comprising a plurality of running windings; a plurality of shaded pole coils, said shaded pole coils being connected in electrical series with each other; normally open switch means in series with all of said shaded pole coils; a relay coil connected in series with said running windings; said normally open switch means being operatively arranged to close in response to current flow of at at least a predetermining magnitude through said relay coil and to reopen whenever the current flow is reduced to a given magnitude less than said predetermined magnitude as the motor reaches substantially a given speed, whereby local overheating is reduced and energy waste is avoided.

5. The shaded pole induction motor according to claim 4, wherein the respective pluralities of running windings and shaded pole coils are equal.

6. The shaded pole induction motor according to claim 5, wherein each respective shaded pole coil is operatively coupled to a respective corresponding different one of the running windings.

7. A shaded pole induction motor comprising a plurality of running windings; a plurality of shaded pole coils, said shaded pole coils being connected in electrical series with each other; a normally closed centrifugal force responsive switch means connected in series with said shaded pole coils and responsive to motor speed for interrupting current flow through all of the shaded pole coils whenever the motor reaches substantially a predetermined speed; and a heat-responsive circuit breaker connected in series with said centrifugal force responsive switch means and with said shaded pole coils for interrupting current flow through all of said shaded pole coils and through said centrifugal force responsive switch means whenever too high a current flow through said shaded pole coils and said switch means has persisted for too long a period causing said heat-responsive circuit breaker to open; whereby local overheating is reduced and energy waste avoided.

8. The shaded pole induction motor according to claim 7, wherein the respective pluralities of running windings and shaded pole coils are equal.

9. The shaded pole induction motor according to claim 8, wherein each respective shaded pole coil is operatively coupled to a respective corresponding different one of the running windings.

10. A shaded pole induction motor comprising a plurality of running windings; a relay winding in series with said running windings; a plurality of shaded pole coils, said shaded pole coils being connected in electrical series with each other; a normally closed during starting relay-controlled switch means connected in series with said shaded pole coils and responsive to current flow in said relay winding for interrupting current flow through all of the shaded pole coils whenever the motor reaches substantially a predetermined speed and current through said relay winding and through said plurality of running windings falls to a predetermined level; and a heat-responsive circuit breaker connected in series with said relay-controlled switch means and with said shaded pole coils for interrupting current flow through all of said shaded pole coils and through said relay-controlled switch means whenever too high a current flow through said shaded pole coils and said relay-controlled switch means has persisted for too long a period causing said heat-responsive circuit breaker to open; whereby local overheating is reduced and energy waste avoided.

11. The shaded pole induction motor according to claim 10, wherein the respective pluralities of running windings and shaded pole coils are equal.

12. The shaded pole induction motor according to claim 11, wherein each respective shaded pole coil is operatively coupled to a respective corresponding different one of the running windings.

* * * * *